United States Patent
White et al.

(10) Patent No.: US 6,747,096 B2
(45) Date of Patent: *Jun. 8, 2004

(54) BLOCK COPOLYMERS OF LACTONE AND LACTAM, COMPATIBILIZING AGENTS, AND COMPATIBLIZED POLYMER BLENDS

(75) Inventors: James L. White, Akron, OH (US); Charles E. Wilkes, Akron, OH (US); Byong-Jun Kim, Sugar Land, TX (US)

(73) Assignee: University of Akron, Akron, OH (US)

( * ) Notice: Subject to any disclaimer, the term of this patent is extended or adjusted under 35 U.S.C. 154(b) by 100 days.

This patent is subject to a terminal disclaimer.

(21) Appl. No.: 10/108,801

(22) Filed: Mar. 27, 2002

(65) Prior Publication Data

US 2003/0027927 A1 Feb. 6, 2003

Related U.S. Application Data

(63) Continuation-in-part of application No. 09/832,228, filed on Apr. 10, 2001, now Pat. No. 6,486,257.

(51) Int. Cl.$^7$ .............................................. C08L 77/00
(52) U.S. Cl. .................................... 525/92 A; 525/179
(58) Field of Search ................................. 525/92 A, 179

(56) References Cited

U.S. PATENT DOCUMENTS

| | | |
|---|---|---|
| 2,251,519 A | 8/1941 | Joyce et al. |
| 3,017,391 A | 1/1962 | Mottus et al. |
| 3,021,313 A | 2/1962 | Cox et al. |
| 3,021,316 A | 2/1962 | Cox et al. |
| 3,071,391 A | 1/1963 | Dye |
| 3,200,095 A | 8/1965 | Wichterle et al. |
| 3,371,055 A | 2/1968 | Iling et al. |
| 3,758,631 A | 9/1973 | Werner et al. |
| 3,979,479 A | 9/1976 | Radici et al. |
| 3,979,480 A | 9/1976 | Radici et al. |
| 4,788,249 A | 11/1988 | Maresca et al. |
| 5,468,837 A | 11/1995 | Wautier |
| 5,691,412 A | 11/1997 | Matsumura et al. |
| 5,801,224 A | 9/1998 | Narayan et al. |
| 5,856,405 A | 1/1999 | Hofmann |
| 5,981,008 A | 11/1999 | Hofmann |

FOREIGN PATENT DOCUMENTS

| GB | 1099184 | 1/1968 |
|---|---|---|

OTHER PUBLICATIONS

*Anionic Ring Opening Polymerizations of Lactams and Laciones in modular co–rotating twin screw extruders—*Polymer Processing Society—North American Meeting — Toronto, Ontario, Canada, Aug. 17–19, 1998 –, Seung–Ku Ha, Byong–Jun Kim, and James L. White, Institute of Polymer Engineering, University of Akron, Akron, OH.

*Copolyesteramides I—Anionic Copolymers of ωLaurolaciam with •Caprolactone* –European Polym. J. vol. 20, No. 3, pp. 241–247, 1984, Printed in Great Britian –, Goodman, School of Polymer Science, University of Bradford, Bradford, West Yorkshire BD7 IDP, U.K. and A. Valavandis, Department of Organic Chemistry, University of Athens, Athens, 144, Greece.

*Copolyesteramides—Anionic Copolymers of εcaprolactam with εcaprolactone, Preparation and General Properties–*European Polym. J. vol. 20, No. 6, pp. 529–537, 1984, Printed in Great Britian —, I. Goodman, Department of Polymer & Fibre Science, University of Manchester Institute of Science and Technology, Manchester M60 IQD and School of Polymer Science, University of Bradford, Bradford BD7 IDP, U.K. and R. N. Vachon, Department of Polymer & Fibre Science, University of Manchester Institute of Science and Technology, Manchester M60 IQD.

*Living Polymerization of εCaprolactone Application To Reactive Processing–*Polymer Processing Society —14, Yokohama, Japan, 1998, J. Gimenez, P. Cassagnau and A. Michel, Laboratoire des Materiaux Plastiques et Biomateriaux, UMR5627, Batiment 305; Universite Claude Bernard, Lyon 1, Bvd du Nov. 11, 1918, 69622 Villeurbanne Cedex.

(List continued on next page.)

*Primary Examiner*—Ana L. Woodward
(74) *Attorney, Agent, or Firm*—Hudak, Shunk & Farine Co

(57) ABSTRACT

This invention relates to high molecular weight block copolymers of one or more lactones and/or one or more lactams prepared by sequential bulk polymerization using a mixture of at least one anionic polymerization initiator and optionally at least one co-initiator. A preferred continuous sequential bulk reactive extrusion process comprises feeding a mixture of at least one lactam, at least one anionic polymerization initiator, and at least one co-initiator into the first (i.e., upstream) hopper of an extruder, and thereafter feeding at least one lactone into a second (i.e., downstream) hopper of the extruder. The preferred continuous sequential bulk reactive extrusion is solvent free, rapid (typical mean and maximum residence times in the extruder being no more than about 20 minutes and 30 minutes respectively), and produces a high conversion of monomers to block copolymer.

The poly(lactone(s)/lactam(s)) block copolymer compatibilize the blending of otherwise immiscible or poorly miscible polymers to form polymer blends having improved mechanical and thermal properties. Accordingly, the block copolymers can be compounded with chlorine or fluorine containing polymers and other polymers such as polyamides, anhydride polymers such as maleic anhydride, and the like. To improve the impact resistance of the compatibilized blend, impact modifiers can be utilized such as maleic anhydride modified EPM, EPDM, and the like. To improve thermal and mechanical properties, thermal performance modifiers can be utilized such as maleic anhydride polyolefins or maleic anhydride modified polymers made from vinyl substituted aromatic monomers.

8 Claims, No Drawings

OTHER PUBLICATIONS

*Bulk Polymerization of εCaprolactone in Twin Screw Extruder*–International Polymer Processing XV (2000) J. Gimenez M. Boudris, P. Cassagnau, and A. Michel, Laboratoire d'Etudes des Materiaux Plastiques et des Biomateriaux, Universite Claude Bernard Lyon 1, Villeubanne, France, Hanser Publisher, Munich.

*Continuous Polymerization of Caprolactam in a Modular Intermeshing Corotating Twin Screw Extruder Integrated with Continuous Melt Spinning of Polyamide 6 Fiber: Influence of Screw Design and Process Conditions*–Journal of Applied Polymer Science, vol. 52, pp. 1249–1262, (1994), Published by John Wiley & Sons, Inc., 1994.

*Lactone Polymers. I. Glass Transition Temperature of Poly–εcaprolactone by Means of Compatible Polymer Mixtures*–Journal of Polymer Science, Part A–2, vol. 7, pp. 795–807 (1969), J.V. Koleske and R.D. Lundberg, Union Carbide Corporation, Chemicals and Plastics, Technical Center, South Charleston, West Virginia 25303.

*Small–Angle X–Ray and Light Scattering Studies of the Morphology of Blends of Poly(εcaprolactone) with Poly(vinyl Chloride)* —Journal of Polymer Science: Polymer Physics Edition, vol. 14, pp. 1391–1424 (1976), F.B. Dhambatta, F. Warner, T. Russel, and R.S. Stein, Polymer Research Institute and Department of Chemistry, University of Massachusetts, Amherst, MA, 01002, published by John Wiley & Sons, Inc., 1976.

*On the Application of Fourier Transform Infrared Spectroscopy to the Elucidation of Specific Interactions in Miscible Polyester–Poly(vinyl chloride) Blends*–Polymer Engineering and Science, Aug. 1983, vol. 23, No. 12, Daniel F. Varnell Eric J. Moskala, Paul C. Painter, and Michael M. Coleman, Polymer Science Section, Materials Science and Engineering Department, The Pennsylvania State University, University Park, PA 16802.

*Some Aspects of the Miscibility Behavior of Polyester/Halogenated Polymer Blends*–Polymer Engineering and Science, Mid–Dec., 1982, vol. 22, No. 17, R.E. Prud'Homme, Group de recherch8 sur les macromolecules Department de chimie Universite Laval Quebec Canada GIK 7P4.

*Dielectric Properties of Poly(α–Methyl–αN–Propyl–β–Propiolactone)/Poly (Vinyl Chloride) Blends* —Polymer Engineering and Science, Mid– Feb., 1984, vol. 24, No. 2, Tariq M. Malik and Robert E. Prud'Homme, Group de recherché sur les macromolecules Chemistry Department, Laval University, Quebec Canada GIK 7P4.

*Blends of Poly(ε–Caprolactone) with Poly(Vinyl Chloride), I. Morphology*—Journal of Polymer Science: Polymer Symposium 63, pp. 45–58 (1978), C. J. Ong and F.P. Price, Polymer Science and Engineering Department, Materials Research Laboratory, University of Massachusetts, Amherst, MA 01003, Published by John Wiley & Sons, Inc., 1978.

US 6,747,096 B2

BLOCK COPOLYMERS OF LACTONE AND LACTAM, COMPATIBILIZING AGENTS, AND COMPATIBLIZED POLYMER BLENDS

CROSS REFERENCE

This application is a continuation-in-part of U.S. Ser. No. 09/832,228, filed Apr. 10, 2001, now U.S. Pat. No. 6,486,257, for BLOCK COPOLYMERS OF LACTONE AND LACTAM, COMPATIBILIZING AGENTS, AND COMPATIBILIZED POLYMER BLENDS.

FIELD OF THE INVENTION

This invention relates to compatibilizing agents for blends of chlorine containing polymers and carbonyl containing compounds such as polyamide having improved mechanical and thermal properties. The compatibilizing agents are block copolymers of lactones and lactams prepared by sequential bulk polymerization using a mixture of at least one anionic polymerization initiator and optionally at least one co-initiator. Various thermal performance modifiers and impact modifiers can be utilized to improve the thermal properties as well as the impact resistance of a compatibilized blend.

BACKGROUND OF THE INVENTION

The first studies of the polymerization of lactones were in the 1930s by W. H. Carothers and his coworkers. Subsequently, the mechanisms of cationic, anionic, and coordination polymerization of various lactones were studied throughout the 1950's to the present. It is well known that polylactones, notably poly($\epsilon$-caprolactone), of high molecular weight mass exhibit a high compatibility and miscibility with many thermoplastics and elastomeric polymers. Polylactones having melting points lower than polyethylene are thermally stable up to 220° C. Above this temperature, they slowly depolymerize to yield lactone monomer and oligomer. Union Carbide, Solvay, and Daicel are commercial producers of a series of polycaprolactones possessing various ranges of molecular weights.

The first commercial polyamides also were developed by W. H. Carothers at the DuPont Company. He obtained many patents on polyamides produced from dicarboxylic acids and diamines. Shortly after DuPont's entry into the field, I. G. Farbenindustrie obtained patents for polymers based on the ring-opening polymerization of $\epsilon$-caprolactam. Linear aliphatic polyamides, frequently referred to generically as nylons, rank among the most important commercial polymers. They were introduced in the 1930s as the first synthetic fiber, and subsequently as the first crystalline engineering thermoplastic.

Lactone and lactam polymerization caused by a ring-opening process can lead to high molecular weight polymers. Such polymerization of lactones usually has been conducted at relatively low temperatures in an appropriate solvent and at modest rates.

Solvent-free (i.e., bulk) polymerization has been of interest to industry because of its great economic savings. However, one of the problems of bulk polymerization is a difficulty of temperature control caused by exothermic reaction. U.S. Pat. No. 3,021,313 relates to aluminum alkoxides as initiators of the polymerization of monomeric cyclic esters in a conventional reactor. U.S. Pat. No. 3,021,016 relates to metal hydrides as initiators of the polymerization of monomeric cyclic esters in a conventional reactor. The polymers of the patents can be prepared via bulk, suspension, or solution polymerization.

Advantages of the screw extruder as a chemical reactor include fewer processing steps and no need for a solvent. On-line (i.e., in-situ) polymerization, mixing and compounding allow continuous downstream processing, easy devolatilization of by-product, and easy recycling of products. Thus continuous polymerization using a screw extruder (i.e., reactive extrusion) is attractive as an alternative to both bulk and solvent polymerization.

Continuous monomer polymerization of certain urethanes, lactams, acrylates, and styrene using a screw extruder is known in the prior art. Co-rotating and counter-rotating twin screw extruders are considered to be attractive chemical reactors providing good technical and economical means for polymerization and polymer modification.

In particular, continuous polymerization of $\epsilon$-caprolactone in a screw extruder has become possible with alkoxymetallic complexes as initiators that result in short reaction times. U.S. Pat. No. 5,468,837 relates to reactive extrusion of $\epsilon$-caprolactone using aluminum alkoxides. U.S. Pat. No. 5,801,224 relates to reactive extrusion of a cyclic aliphatic ester (e.g. a lactone monomer such as $\epsilon$-caprolactone), optionally together with a secondary component containing hydroxyl or amino group functionality, using coordination insertion catalysts and/or initiators such as Lewis acids and metal alkoxides. The ester must contain less than 100 ppm water and have an acid value less than 0.5 mg KOH/g and preferably less than 0.2 mg KOH/g. It is indicated that higher water and acid content reduces overall polymerization rate and ultimately leads to lower conversion of monomer to polymer. Further, Gimenez et al. reported the reactive extrusion of $\epsilon$-caprolactone catalyzed by tetrapropoxytitanium in Polymer Processing Society 14$^{th}$ Annual Meeting (Yokohama, Japan), PPS-14, pp. 629–630 (1998), and also in International Polymer Processing 15, pp. 20–27 (2000).

U.S. Pat. No. 2,251,519 relates to random polymerization of cyclic amides such as caprolactam, optionally together with cyclic esters such as caprolactone, using any of the alkali or alkali earth metals. However, the reaction was slow, e.g., ½ hour to 5 hours. U.S. Pat. No. 3,017,391 relates to faster polymerization of $\epsilon$-caprolactam at lower temperatures using certain nitrogen-containing promoters together with alkali and alkali earth metal catalysts. U.S. Pat. No. 3,200,095 relates to reactive extrusion of 6-caprolactam using a mixture of an alkali metal salt of 6-caprolactam and certain N-substituted compounds free of primary amino groups, such as N-acetyl-6-caprolactam. U.S. Pat. No 3,371,055 relates to reactive extrusion of lactams using a catalyst such as certain alkali or alkali earth metal compounds or certain organometallic compounds of the first to third main group of the Periodic Table, together with certain activators such as acylated lactams and lactams having groups with acylating activity attached to the lactam nitrogen. An article by Kye et al. (Journal of Applied Polymer Science, Vol. 52, pp. 1249–1262 (1994)) relates to reactive anionic polymerization of caprolactam integrated with continuous melt spinning of polyamide-6 fiber.

U.S. Pat. No. 3,758,631 relates to block copolymers prepared by (1) end-capping and optionally chain-extending a polylactone diol with a diisocyanate and (2) thereafter reacting the first step reaction product with caprolactam in the presence of an anionic catalyst for the polymerization of caprolactam. The first step is said to take from about 15 minutes to 3 or 4 hours and the second step from 0.1 to 18 hours. However, the examples show reaction times of hours, making the process impractical for reactive extrusion.

British Patent No. 1,099,184 relates to poly(lactone-lactam)s in which as few as 5 for every 100 units of the polymer chain are amide units. The copolymers are solid crystalline materials having high melting temperature and being substantially insoluble in hydrocarbons. Although the patent states that it includes both random and block copolymers, it is apparent that only random copolymers were envisaged, since each example produced a material with a single, narrow melting point range. The patent also states that the polyesteramides can be blended with other polymers, but there is no teaching as to why or how this might be done.

An article by Goodman et al. (Eur. Polym. J., Vol. 20, No. 3, pp. 241–247 (1984)) relates to copolymers of ε-caprolactone and ω-lauryl lactam prepared via anionic polymerization. The products are said to have relatively random structures. However, it is known by those skilled in the art that random ε-caprolactone/ω-lauryl lactam copolymers do not work well if at all to compatibilize blending of PVC with other thermoplastics.

An abstract by Ha et al. presented at the Polymer Processing Society's Aug. 17–19, 1998 meeting in Toronto, Ontario relates to a simultaneous and to a continuous sequential bulk polymerization of lauryl lactam, caprolactone, caprolactam/lauryl lactam, and caprolactone/caprolactam using several anionic catalysts.

New block copolymers are desired that are both relatively easy to prepare, especially via reactive extrusion, as well as suitable for compatibilizing (i.e., facilitating or enhancing) blending of chlorine containing polymers (such as vinyl chloride polymers and the like) with other polymers (such as nylons, maleic anhydride polymers, and the like) in order to produce blends having improved mechanical and thermal properties.

SUMMARY OF THE INVENTION

This invention relates to compatibilized blends of chlorine containing polymers and carbonyl containing polymers utilizing high molecular weight block copolymers of lactones and lactams such as ε-caprolactone (also known as 6-caprolactone) and ω-lauryl lactam (also known as 12-lauryl lactam) prepared by a sequential bulk polymerization using at least one anionic polymerization initiator and optionally at least one co-initiator block. The block copolymerization of the compatibilizing agent can be performed sequentially in a single reaction vessel by preferably (1) feeding a mixture of ω-lauryl lactam, at least one anionic polymerization initiator, and optionally at least one co-initiator into the vessel and allowing polymerization to occur, and (2) thereafter feeding ε-caprolactone into the same vessel and allowing the block copolymer to form. Alternatively, the first step can be performed in one reaction vessel and the reacted contents transferred to a second reaction vessel before addition of ε-caprolactone and formation of the block copolymer.

In a preferred embodiment, a single or preferably a twin screw extruder is used as the polymerization reactor in a continuous sequential bulk reactive extrusion process to prepare, for example, the poly(ε-caprolactone/ω-lauryl lactam) block copolymers of this invention. The continuous reactive extrusion process comprises (1) feeding a mixture of ω-lauryl lactam, at least one anionic polymerization initiator, and at least one co-initiator into the first (i.e., upstream) hopper of a heated, operating extruder, and (2) thereafter feeding ε-caprolactone into a second (i.e., downstream) hopper of said extruder.

The invention further relates to utilizing thermal performance modifiers as well as impact modifiers to improve thermal properties such as heat resistance and to improve the impact resistance of the compatibilized blends.

DETAILED DESCRIPTION OF THE INVENTION

The present invention relates to compatibilized blends of a chloride containing polymer and at least a carbonyl containing polymer. Chlorine containing polymers suitable for use in the present invention are thermoplastics well known to those skilled in the art. The term "chlorine containing polymers" includes both polymers derived from chlorine-containing monomers, as well as polymers that are chlorinated during or after polymerization. Examples of such chlorine containing polymers include vinyl chloride homopolymers (PVC), chlorinated PVC (CPVC), polyvinylidene chloride, chlorinated olefins such as chlorinated polyethylene, chlorinated polypropylene, and the like. Other examples include copolymers of vinyl chloride with vinyl acetate; with olefins containing from 2 to about 6 carbon atoms such as ethylene, propylene, chlorinated propylene, butalyene, or, isobutylene; with vinylidene chloride; with acrylonitrile; with a conjugated diene having from 4 to 8 carbon atoms such as butadiene; with a vinyl substituted aromatic having from 8 to 12 carbon atoms such as styrene, and the like. Mixtures of such polymers can also be used. Vinyl chloride homopolymers and copolymers are preferred. The amount of such comonomers when utilized is generally from about 5 to about 95 and desirably from about 30 to about 70 percent by weight based upon the total weight of the copolymer. The above polymer or copolymers can contain various additives known to the literature and to the art, such as plasticizers, in conventional amounts.

Examples of thermoplastics carbonyl containing polymers include polyamides (nylons) such as those made from internal amides (lactams) having a total of from about 4 to about 20 carbon atoms such as polyamide 4 (polybutyrolactam), polyamide 6 (polycaprolactam), polyamide 12 (polylauryl lactam), or polyamides made by the condensation reaction of a diamine monomer having a total of from about 4 to about 15 carbon atoms with a dicarboxylic acid having from about 4 to about 15 carbon atoms such as polyamide 66 (a condensation product of adipic acid and hexamethylenediamine), polyamide 610 (a condensation product of sebacic acid and hexamethylenediamine), polyamide 6–12, polyamide 12—12, and the like with polyamide 12 (polylauryl lactam) being especially preferred. Such polymers can contain conventional additives known to the literature and to the art in conventional amounts.

The amount of the one or more chlorine containing polymers is generally from about 10% or 20% to about 99%, and preferably from about 15%, 35% or 50% to about 90% by weight based upon the total weight of the one or more chlorine containing polymers and the one or more carbonyl containing polymers forming the blend.

The compatibilizing agents relate to block copolymers made from one or more cyclic esters such as lactones and from one or more lactams, wherein the lactones have a total of from about 4 to about 10 carbon atoms, such as γ-butyrolactone, δ-valerolactone, α-methyl-γ-valerolactone, ε-caprolactone, 9-hydroxynonanoic acid lactone, and the like, with about six carbon atoms, i.e. ε-caprolactone being preferred. The one or more lactams generally can have a total of from about 4 or about 8 to about 20 carbon atoms such as β-propiolactam, γ-butyrolactam, δ-valerolactam, ε-caprolactam, and ω-lauryl lactam, and the like with about 11 or 12 carbon atoms being preferred, for example ω-lauryl lactam.

The compatibilizing agents are generally block copolymers of a lactone and a lactam preferably prepared by sequential bulk polymerization using at least one anionic polymerization initiator and optionally at least one co-initiator. The sequential bulk polymerization generally is a sequential anionic living polymerization in which at least one lactam such as ω-lauryl lactam monomer is polymerized using the initiator and co-initiator, followed by chemical attachment of at least one lactone monomer such as ε-caprolactone to the propagation chain end of the living poly(lauryl lactam) anion. The block copolymers typically are di-block (AB) copolymers having repeating units such as follows:

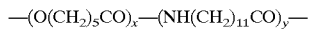

wherein "x" and "y" represent the number of units in the respective "A" (e.g. polymerized ε-caprolactone) and "B" (e.g. polymerized ω-lauryl lactam) blocks. However, other block copolymers also can be produced, such as the ABA tri-block copolymers described below. The amount of the one or more lactone blocks of the invention can range from about 1 wt. % to about 80 wt. %. However, for the compatibilizing purposes described herein, the amount of the lactone block in said block copolymers desirably ranges from about 10 wt. % to about 70 wt. %, preferably from about 20 wt. % to about 65 wt. %, and more preferably from about 25 wt. % or 30 wt. % to about 55 wt. % or 65 wt. %, based upon total weight of the block copolymer. Naturally, the difference is the amount of the one or more lactam blocks.

An aspect of the present invention is the utilization of two or more mixed lactone monomers so that a statistical A block copolymer is formed such as by using a blend of δ-valerolactone and ε-caprolactone. Similarly, an important aspect is that at least two different or mixed lactam monomers can be utilized to form a statistical B block copolymer such as when ε-caprolactam and ω-lauryl lactam are utilized. Generally, the amount of any one monomer when utilized with at least another lactone monomer to form a statistical lactone block copolymer is from about 5 to about 95 mole percent and desirably from about 20 to about 80 mole percent based upon the total number of moles of all of the two or more monomers utilized in forming the lactone block. However, when caprolactone is one of the monomers, the amount thereof is generally high as from about 70 to about 95 mole percent with the remaining one or more lactone monomers being the difference. Desirably, the lactone block is made from only ε-caprolactone. When a lactam block is made, the mole percent of any lactam monomer is generally from about 5 to about 95 percent by weight based upon the total number of moles of all the two or more lactam monomers utilized in forming the lactam block. Inasmuch as caprolactam is inexpensive and suitable compatibility properties exist when substantial amounts thereof are utilized, the amount of lauryl lactam is generally low such as from about 10 or about 15 mole percent to about 30 or about 40 mole percent with the remaining mole percent desirably being caprolactam monomers. Such mixed statistical A and/or B block copolymers have the advantage of low or no crystallinity which results in better miscibility of the chlorine containing polymers and the carbonyl containing polymers. The amount of such crystallinity is such that the block copolymers generally have a heat of fusion of about 35 or less and desirably 30 or less calories per gram. Hereinafter, in discussing the preparation or utilization of the lactone-lactam block copolymer compatibilizing agents, it is to be understood that either component thereof, and preferably the lactam component can be made from two or more different monomers.

Suitable initiators for use in this invention are well known to those skilled in the art and include Group IA (periodic table IUPAC notation, i.e., so-called "alkaline") metals, hydrides, and salts, and preferably Group IA metals and hydrides. Lithium, sodium, and potassium metals and hydrides are more preferred, such as Li, Na, K, lithium hydride, sodium hydride, and the like. Other suitable initiators include Group IIA (periodic table IUPAC notation, i.e., so-called "alkaline earth") hydrides and salts, and preferably Group IIA hydrides, such as calcium hydride, and the like. Mixtures of initiators can also be used. Typical initiator concentrations can vary from about 1 mmol/mol to about 30 mmol/mol, and preferably from about 4 mmol/mol to about 15 mmol/mol, based on total moles of ε-caprolactone and ω-lauryl lactam monomers.

Typically at least one co-initiator is used in an amount of molar concentration in order to keep reaction time of polymerization below about 20 minutes, especially when an extruder is used as the reaction vessel. However, longer reaction times can be suitable in other reaction vessels such as stirred tank reactors, in which case a co-initiator need not be used. The amount of the at least co-initiator is generally from 1 to about 30 and preferably from about 5 to about 20 mmol/mol of total lactam and lactone monomers.

Co-initiators suitable for use in the sequential polymerization include acylated lactam derivatives having the formula:

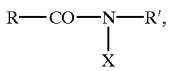

as well as Group IA (periodic table IUPAC notation) salts of said derivatives, and mixtures thereof, wherein R and R' independently are hydrogen or an alkyl group having from 4 to 10 carbon atoms, preferably 4 to 7 carbon atoms, wherein R and R' can join together form an alkylene group in a cyclic structure, and X designates a polar substituent such as an acyl, carbonyl, or cyano group, or the like. Examples of such acylated lactam derivatives are set forth in U.S. Pat. No. 3,200,095, hereby fully incorporated by reference, and include N-acetyl-6-caprolactam, and the like, and mixtures thereof.

Other suitable co-initiators include an isocyanate, such as those having the formula

wherein R is a hydrocarbon, halohydrocarbon or other generally inert organic group containing carbon atoms, preferably a hydrocarbon group containing from 1 to 10 carbon atoms. The term "generally inert" refers to organic radicals that do not tend to interfere with the sequential bulk polymerization of this invention. Isocyanates typically are mixtures rather than pure monoisocyanates, diisocyanates, or the like; thus "n" in the above formula can be from about 1 to about 3, and preferably is about 2. Use of a monoisocyanate as a co-initiator ideally produces e.g. an AB, e.g. a poly(ε-caprolactone-ω-lauryl lactam) di-block copolymer. Use of a diisocyanate as a co-initiator ideally produces an ABA tri-block copolymer, such as a poly(ε-caprolactone-ω-lauryl lactam-ε-caprolactone) block copolymer. Naturally, when ε-caprolactone is polymerized with monomers of ε-caprolactam and ω-lauryl lactam, either an AB di-block copolymer, i.e. poly(ε-caprolactone-ω-lauryl lactam and ε-caprolactam) is produced, or an ABA tri-block copolymer, i.e. poly(ε-caprolactone-lauryl lactam and caprolactam-ε-caprolactone), is produced. Of course, numerous other combinations of block copolymers containing at least one mixed block can be made.

Examples of suitable diisocyanates include toluene 2,4- and/or 2,6-diisocyanate, 4,4'-diisocyanato-diphenylmethane, diphenyl-4,4'-diisocyanate, m-phenylene diisocyanate, p-phenylene diisocyanate, xylylene diisocyanate, 4-chloro-1,3-phenylene diisocyanate, benzophenone-naphthalene diisocyanate, 1,5-tetrahydronaphthalene diisocyanate, 1,4-cyclohexylene diisocyanate, 1,4-tetramethylene diisocyanate, 1,6-hexamethylene diisocyanate, 1,10-decamethylene diisocyanate, and 4,4'-methylene-bis(cyclohexyl isocyanate). 1,6-hexamethylene diisocyanate is preferred. Isocyanate mixtures can also be used.

Sequential bulk polymerization in a single reaction vessel can be performed by a process comprising (1) feeding a mixture of at least one lactam monomer, at least one anionic polymerization initiator, and optionally at least one co-initiator into a single reaction vessel and allowing polymerization to occur, and (2) thereafter feeding a lactone such as ε-caprolactone, or a blend of lactone monomers, into the same reaction vessel and allowing the block copolymer to form. Alternatively, the first step can be performed in one reaction vessel and the contents transferred to a second reaction vessel before addition of the lactone monomer(s) and formation of the block copolymer. It is preferred that the total amount of initiator and optional co-initiator be added during step (1) of the polymerization, and that no initiator and/or co-initiator be added during step (2) so as to avoid undesirable formation of ε-caprolactone oligomers and homopolymers.

In a preferred embodiment, a single or preferably a twin screw extruder is used as the polymerization reactor in a continuous sequential bulk reactive extrusion process to prepare the block copolymers of this invention. The reactive extrusion process comprises (1) feeding a mixture of one or more lactam monomers such as ω-lauryl lactam, at least one anionic polymerization initiator, and at least one co-initiator into the first (i.e., upstream) hopper of a heated, operating extruder, and (2) thereafter feeding one or more lactone monomers such as ε-caprolactone into a second (i.e., downstream) hopper of said extruder. The preferred reactive extrusion process of the present invention is substantially solvent free, rapid (typical mean and maximum residence times being no more than about 20 minutes and about 30 minutes respectively), and produces a high conversion of monomers to block copolymer. By the term "substantially solvent free" it is meant that the amount of solvent is generally less than 50% or 25%, desirably less than 15%, and preferably less than 5%, 3%, 2%, or 1% by weight based upon the total weight of the monomers added to form the block copolymer. Said process produces a block copolymer wherein each block, including a mixed block typically has a number average molecular weight ($M_n$) from about 5,000 or 10,000 to about 180,000, and more desirably from about 20,000 to 30,000 to about 100,000 or 150,000 (as measured by the method described hereinafter). However, mixed lactam blocks generally have a $M_n$ of from about 10,000 to about 25,000 or to about 30,000.

Suitable extruders for the process of this invention must accomplish the following functions: (1) mixing the substances introduced (in this case comprising the mixtures of monomers, initiator(s) and co-initiator(s)), (2) conveying the substances as they form a block copolymer from their respective feed zones to a discharge zone such as a die, and (3) maintaining appropriate reaction temperatures. Suitable extruders advantageously will be provided with a degassing vent located near the die. Any known and conventional extruders based on the work of one, two, or a number of screws, whether rotating in the same (co-rotating) or opposite (counter-rotating) directions, are suitable for reactive extrusion to prepare the block copolymers of the invention. The screws can be intermeshing or non-intermeshing (i.e., tangential). Excellent results have been obtained using extruders having two co-rotating, intermeshing screws. Modular twin screw extruders are preferred, i.e., extruders in which screw segments can be assembled (i.e., configured) in customized order in order maximize conversion of monomers to block copolymers. The design of modular screw configurations is well understood by those skilled in the art. Examples of suitable extruders include the Japan Steel Works model TEX-30, which is a 30-mm diameter co-rotating, intermeshing twin screw extruder. Other examples of suitable extruders include the Werner and Pfleiderer model ZSK-30, and the Berstorff model ZE-60. Extruders containing larger screws can also be utilized.

Feed rates to the extruder of monomers, initiators and co-initiators are determined according to the size of the extruder, as well as the desired mean and maximum residence time of reactants in the extruder, according to principles well understood by those skilled in the art. Higher feed rates will result in shorter mean and maximum residence times. Extruder screw speeds can be chosen with consideration of shear level, residence time, and heat generation. For example, a feed rate of about 2 to about 10 kg/hr and a screw speed of about 50 to about 300 rpm are preferred for higher conversion of monomers to block copolymers in a 30-mm diameter screw extruder, such as the Japan Steel Works model TEX-30 and the Werner and Pfleiderer model ZSK-30. Extruder barrel temperature will also affect polymerization rates and can be from about 175° C. to about 300° C. for the lactam monomer and from about 180° C. to about 250° C. for the lactone monomer.

The block copolymer can be prepared by feeding the preheated one or more lactone monomers such as $\epsilon$-caprolactone into the second hopper. It can be preheated from about 25° C. to about 200° C. in a stirred vessel under a nitrogen atmosphere. A lactam reaction mixture containing one or more monomers such as $\omega$-lauryl lactam, initiator, and co-initiator is fed into the first (i.e., upstream) hopper of a screw extruder, and subsequently the preheated lactone is fed into a second (i.e., downstream) hopper. It is preferred that the two hoppers be separated by a distance allowing at least about one minute of residence time in the extruder of the first-step materials in order to allow formation of the $\omega$-lauryl lactam "B" block portion before addition of $\epsilon$-caprolactone to form the "A" block of the block copolymer. The extruder is purged with an inert gas such as nitrogen, argon, etc., during the reactive extrusion process.

The reactive extrusion process produces a yield of at least about 50%, desirably about 60% or 70% and preferably at least about 80%, 90%, or 95% by weight of the block copolymer. Usually, no purification step typically is needed to remove oligomers, homopolymers, and unreacted monomers. The gel permeation chromatography (GPC) test method described hereinafter is used to verify both the molecular weight (MW) and the substantial purity of the block copolymers. After extraction using toluene to ensure removal of polylactone homopolymer, differential scanning calorimetry (DSC) using the test method described hereinafter shows two distinct melting points, indicating production of a block copolymer.

Downstream processing of the block copolymers of the invention can be delayed or can be conducted immediately after the reactive extrusion process. For example, the block copolymers can be cooled, converted into particles, and stored for further processing. Alternatively, the block copolymers can be processed immediately, e.g., by compounding the block copolymers while they are still warm with chlorine containing polymers and optionally other ingredients to form polymer blends having improved mechanical and thermal properties. Processing steps such as pelletizing, film casting, fiber melt spinning, blow molding and injection molding can be integrated into post-reactive extrusion processing. Immediate processing following completion of the reactive extrusion process has the advantage of reducing the thermal history of the final product by eliminating at least one cooling and re-melting step.

The polymers formed from lactams and lactones such as poly($\epsilon$-caprolactone) homopolymer and poly($\omega$-lauryl lactam) homopolymer or poly($\omega$-lauryl lactam and $\epsilon$-caprolactam) copolymer are generally incompatible with one another in their semi-crystalline states. Furthermore, polyamides generally are incompatible with PVC, while poly($\epsilon$-caprolactone) is miscible with PVC and certain other thermoplastics but does not improve their mechanical and thermal properties. However, the poly(lactone/lactam) block copolymers of the present invention have been found to be good compatibilizing agents for blends of the about noted chlorine containing polymers, and certain other thermoplastics such as polyamides, and also improve the mechanical and thermal properties of the blends.

Additives such as activators, curing agents, stabilizers (such as the Mark series from Witco and the Thermolite series from Elf Atochem), colorants, pigments, plasticizers, waxes, slip and release agents, antimicrobial agents, antioxidants, UV stabilizers, antiozonants, fillers, and the like, can be added optionally during the manufacture of the block copolymers of this invention or during subsequent processing into finished products.

The block copolymers of the present invention can be blended with chlorine containing polymers, other compatible thermoplastics, additives, and other ingredients by techniques well known to those skilled in the art, such as by mixing of ingredients in an electrical heater mixer, Brabender, or screw extruders. The blended ingredients can be mixed further on heated two-roll mills to form a viscous sheet, followed by cooling the sheet in a hot water tank, granulizing or pelletizing the sheet, and packaging the granules or pellets in bags, drums, or boxes for storage and shipment. The pellets or granules subsequently can be processed to form shaped articles, adhesives, and other products.

The amount of the one or more block copolymers of the present invention which are compatibilizing agents for blends of chlorine containing polymers and carbonyl containing polymers is from about 1 to about 20 or 30 parts by weight, and desirably from about 3, 5, or 8 parts to about 12, or 15 parts by weight for every 100 parts by weight of the total weight of the polymers being blended. Such compatibilized polymer blends can be utilized in a wide variety of applications, such as adhesives, wire insulation, tubing, and gaskets. In particular, the block copolymers are useful in compatibilizing (i.e., facilitating or enhancing) the blending of otherwise immiscible or poorly miscible materials (for example, polyamides blended with chlorine containing polymers) in order to produce polymer blends having improved mechanical and thermal properties for such applications. Of course, more than two different types of polymers can be blended so that multiple polymer blends, i.e. containing from 2 to about 5 or 6 polymers, are also within the scope of the present invention.

In order to retain and/or improve thermal properties, such as high heat stability, ultimate tensile strength, elongation at break, and the like, thermal performance modifiers are used. The thermal performance modifiers are often unsaturated anhydride modified polyolefins or polymers made from vinyl substituted aromatic monomers. Suitable polyolefins are generally made from olefin monomers having from 2 to 6 carbon atoms, desirably 2 or 3 carbon atoms with 3 carbon atoms, i.e. propylene being preferred. Suitable vinyl substituted aromatic monomers generally contain from 8 to 12 carbon atoms with 8 or 9 carbon atoms such as styrene or α-methylstyrene being desired. The unsaturated anhydride monomers contain from 4 to 15 carbon atoms, desirably 4 or 5 carbon atoms with maleic anhydride being preferred. The amount of the unsaturated anhydride which is reacted with the olefin or the vinyl substituted aromatic monomers is such that the amount of anhydride is generally from about 0.1, 0.2, 0.3 or 0.5 to about 3, 5, 7, or 10% by weight based upon the total weight of the anhydride modified polymer.

The thermal performance modifier preferably also contains a significant amount of a polyolefin homopolymer derived from olefin monomers having from 2 to 6 carbon atoms and thus can be polypropylene or polyethylene, or a homopolymer made from vinyl substituted aromatic monomers having from 8 to 12 carbon atoms and thus can be polystyrene. The amount of such so-called base polymers of the thermal performance modifier can vary greatly but often is from about 10 or 20 to about 60 or 80% by weight based upon the total weight of thermal performance modifier.

When utilized, the amount of the thermal performance modifier is generally from about 5 or 10 to about 40 or 50 parts by weight and preferably from about 15 to about 30 parts by weight for every 100 parts by weight of the blended one or more chlorine containing polymers, one or more carbonyl containing polymers, and the block copolymer.

It is desirable to use various impact modifiers to improve at least the impact resistance of the blend of various chloride containing polymers and carbonyl containing polymers. Suitable impact polymers are often various unsaturated anhydride modified flexible polymers. The unsaturated anhydrides generally have from about 4 to about 15 carbon atoms, desirably 4 or 5 carbon atoms with 4 carbon atoms, for example maleic anhydride being preferred. Flexible polymers include rubber polymers, EPM polymers, that is polymers made from ethylene and propylene monomers; and EPDM polymers, that is polymers made from ethylene, propylene, and a non-conjugated diene monomer. Similar flexible rubbers include ethylene, and other alpha olefins such as butylene and styrene. The amount of non-conjugated diene therein is generally from about 0.1 to about 5% and desirably from about 0.2 to about 4% by weight based upon the total weight of the EPDM. The amount of unsaturated anhydride is also generally low, for example, from about 0.1, or 0.2 or 0.3 or 0.5 to about 3, 5, 7, or 10% by weight based upon the total weight of the impact modifier.

The weight of the impact modifier is generally from about 1 to about 50 parts by weight, desirably from about 3 to about 40 and preferably from about 5 to about 30 parts by weight for every 100 parts by weight of the blended one or more per se chlorinated polymers, the one or more per se carbonyl containing polymers such as a polyamide, and the block copolymer.

The mechanism by which the thermal performance and the impact modifiers containing maleic and anhydride work is not fully understood but it is believed that the maleic anhydride portion of the modifier chemically reacts with the amine end group of the polyamide and thus forms a polyamide-g-polymeric modifier which is generally compatible with the polylactam portion of the compatiblizing agent.

The following examples are presented for the purpose of illustrating the invention disclosed herein in greater detail. However, the examples are not to be construed as limiting the invention here in any manner, the scope of the invention being defined by the appended claims.

EXAMPLES

List of Chemicals Used

ε-Caprolactone as "ECEQ Tone Monomer" from Union Carbide.
ω-Lauryl lactam from Ube Industries.
N-Acetyl-ε-caprolactam from Aldrich Chemical Company.
Polyamide 12—poly(ω-lauryl lactam) having a $MW_{avg}$ of about 50,000 from Ube Industries.
PVC—polyvinyl chloride having a $MW_{avg}$ of about 90,000 as "Geon 27" from Geon Company.
Maleic anhydride modified ethylene/propylene/non-conjugated diene elastomer (M-EPDM) "Royaltuf 485" from Uniroyal Chemical—EPDM E/P ratio: 75/25
Maleic anhydride modified polypropylene (M-PP) "Epolene G-3003" from Eastman Chemical
Polypropylene (PP) from Exxon Chemical "ESCORENE 1052"
Sodium hydride from Aldrich Company.
Tin stabilizer—"Thermolite 31-Super" from Elf Atochem.

List of Test Methods

1. Differential Scanning Calorimetry (DSC) was performed under a nitrogen blanket at a heating rate of 20° C./minute using a General V4.1C 2100 instrument from Dupont.
2. Dynamic Mechanical Thermal Analysis (DMTA). ASTM No. D 5023-94 was applied in the three-point bending mode at a heating rate of 4° C./min and a frequency of 1 Hz. Testing was performed using a Rheometric Scientific Dynamic Mechanical Analyzer from Polymer Laboratories. The temperatures reported in these examples (Table II) are the temperatures at which E' (bending storage modulus) falls to 100 Mpa. Higher values of E' in Table II demonstrate better mechanical performance, i.e., better mechanical properties at elevated temperatures.
3. Gel Permeation Chromatography for Molecular Weight Measurement was performed at 100° C. using a Waters 510 pump, three columns, and a Waters 410 refractive index detector (all assembled by Millipore Company). The solvent used was m-cresol, and the reference standard was polystyrene.
4. Tensile Testing for % Elongation at Break and Tensile Strength (Mpa)—ASTM D638 for plastics was used for specimen type V (prepared by compression molding samples at 195° C.). Testing was performed using an Instron 4204 at room temperature and a speed of 50 mm/min.
5. Dynatup Dart Impact Testing—ASTM No. STP 936 was applied at a head speed rate of 4.20 m/sec using Dynatup 8250 from General Research Corp. Specimens were prepared by compression molding at 195° C.

Examples 1 and 2

Preparation of Poly(caprolactone/lauryl Lactam) Di-block Copolymers

All reactive extrusions were performed under a nitrogen atmosphere in a Japan Steel Works model TEX-30 modular intermeshing co-rotating twin screw extruder. The screw diameter was 30 mm, barrel length was 975 mm, and separation of the two screw axes was 26 mm. This twin screw extruder had 8 barrel sections with electric heaters and water cooling systems.

In Examples 1 and 2, the screw configuration had three different sets of kneading disk blocks. The first and second kneading zones were located immediately before the second hopper, while the third zone was located between the second hopper and devolatilization vent near the die.

16 mmol of sodium hydride and 16 mmol of N-acetyl-6-caprolactam for every one mole of ω-lauryl lactam (LA) were mixed. This mixture was fed into the first hopper of the extruder at a constant rate of 1.5 kg/hr at ambient temperature. ε-caprolactone ("CL") heated to 100° C. was fed into the second hopper at a rate of 1.5 kg/hr and 3 kg/hr for Examples 1 and 2 respectively. The temperature of barrel sections of the extruder was maintained at 210° C., and screw rotation speed was 250 rpm. The extrudates were cooled by quenching in a water bath and then granulated using a pelletizer.

Monomer conversions reported in Table I were measured as follows. 20 grams of granulated product was dissolved in 200 ml m-cresol solvent and subsequently poured into an excess amount of cold, rapidly stirred methanol. The precipitated product was filtered and then dried in a vacuum oven for 48 hours at 110° C. The weight of the precipitated, dried polymer was reported as "Monomer Conversion to Polymers (%)" relative to starting monomers and included both block copolymers and homopolymers, but excluded oligomers and residual monomers.

Yields of block copolymers reported in Table I were measured as follows. Polycaprolactone homopolymer was extracted from 20 grams of the precipitated, dried polymer (described above) by Soxhlet extraction for 24 hours using toluene. The residual polymer was dried in a vacuum oven for 24 hours at 50° C. and then weighed as the final poly(ε-caprolactone/ω-lauryl lactam) di-block copolymer. The yield of the residual, dried final polymer was reported as "Yield of Di-block Copolymer (%)" relative to starting monomers.

The weight percent of each component in block copolymers was calculated after subtracting the weight ratio of extracted (by Soxhlet extraction) polycaprolactone homopolymer from the weight ratio of monomer feed rates.

GPC testing of the residual, dried final (i.e., following Soxhlet extraction) poly(ε-caprolactone/ω-lauryl lactam) di-block copolymers for Examples 1 and 2 confirmed that there were no residual polylauryl lactam homopolymers or polycaprolactone homopolymers. Furthermore, a single, narrow GPC curve for each final poly(ε-caprolactone/ω-lauryl lactam) di-block copolymer demonstrated that each was pure block copolymer. Moreover, the GPC peak of polylauryl lactam (sampled from the extruder's second hopper just before feeding caprolactone monomer into that hopper) was not observed in the final products of the poly(ε-caprolactone/ω-lauryl lactam) di-block copolymer.

Differential scanning calorimetry (DSC) testing of the final di-block copolymers for Examples 1 and 2 showed that each di-block copolymer had two different melting peaks at 55° C. and 175° C., which are the melting points of polycaprolactone and polylauryl lactam respectively. After extraction of homopolymers from the products, the existence of two separate melting peaks clearly prove di-block copolymer.

Feed rates of ω-lauryl lactam and ε-caprolactone (kg/hr), number average molecular weights ($M_n$), relative amounts of polymerized ω-lauryl lactam and ε-caprolactone in the final polymers, weight percentage monomer conversions to total polymers, and yields of poly(ε-caprolactone/ω-lauryl lactam) di-block copolymers (as a weight percentage of total starting monomer amounts) are shown in Table I. Examples 1 and 2 were poly(ε-caprolactone/ω-lauryl lactam) di-block copolymers of the present invention.

TABLE I

| Example # | Feed Rates (kg/hr) ($1^{st}$LA/$2^{nd}$CL) | | $M_n$ of Di-block Copolymer | Weight % in Di-block Copolymer (LA/CL) | Monomer Conversion to Polymers (Wt. %) | Yield of Di-block Copolymer (Wt. %) |
|---|---|---|---|---|---|---|
| 1 | 1.5 | 1.5 | 89,000 | 65/35 | 94 | 87 |
| 2 | 1.5 | 3 | 105,000 | 58/42 | 87 | 82 |

PROPHETIC EXAMPLES I AND II

Preparation Of Poly(Caprlaotone/Lauryl Lactam And Caprolactam) Di-Block Copolymers In a manner very similar to Examples 1 and 2, a mixture of lauryl lactam and caprolactam monomers can be utilized to make a lactam block copolymer. The amount of the various components including the polymerization initiator and co-initiators will be the same. In Example I the amount of o-lauryl lactam will be one half mole as will be the amount of caprolactam monomer. In Example II, the amount of ω-lauryl lactam monomer will be 0.15 mole and the amount of caprolactam monomer will be 0.85 mole. In each example, the two lactam monomers were fed into first hopper of an extruder at the indicated rate and heated to about 150° C. to about 160° C. to polymerize the same. Subsequently, the ε-caprolactone was added and heated to 200° C. at the indicated rate. The remaining reaction conditions were the same.

Expected properties of di-block copolymers formed by Examples I and II are set forth in Table A as follows:

TABLE A

| Example # | Feed Rates (kg/hr) (1stLA/2ndCL) | | $M_n$ of Di-block Copolymer | Weight % in Di-block Copolymer Mixed Lactam/Lactone | Monomer Conversion to Polymers (Wt. %) | Yield of Di-block Copolymer (Wt. %) |
|---|---|---|---|---|---|---|
| 1 | 1.5 | 1.5 | ≈40,000 | ≈50/50 | ≈90 | ≈85 |
| 2 | 1.5 | 3 | ≈40,000 | ≈50/50 | ≈90 | ≈85 |

Examples 3 to 12

Testing of Poly(ε-caprolactone/ω-lauryl Lactam) Di-block Copolymers as a Compatibilizing Agent for Mechanical and Thermal Properties for Blending of PVC and Polyamide 12

The PVC and polyamide 12 compositions used in the experiments below are described in the "List of Chemicals" above. The poly(ε-caprolactone/ω-lauryl lactam) di-block copolymer used as a compatibilizing agent in the ternary blends was the copolymer prepared in Example 1. Prior to the experiments below, the PVC was compounded with 3 phr of tin stabilizer (i.e., 3 parts by weight of tin stabilizer per 100 parts by weight of PVC) by tumbling for 4 hours in a rotation tumbling apparatus in order to form a PVC compound.

Binary 2-Polymer blends of PVC compound and polyamide 12 (poly(ω-lauryl lactam)) were prepared in ratios of 80/20, 60/40, 40/60, and 20/80 wt. % (based on the total weight of the blend) without inclusion of poly(ε-caprolactone/ω-lauryl lactam) block copolymer. Comparison ternary polymer blends were prepared using a PVC compound (i.e., PVC compounded with tin stabilizer as described heretofore) and polyamide 12 in approximately the same weight ratios to each other, but also including poly(ε-caprolactone/ω-lauryl lactam) di-block copolymer in an amount of 10 wt. % of the total weight of each ternary blend. Two control blends (Examples 3 and 12) also were prepared containing 100 wt. % PVC compound and 100 wt. % polyamide 12 respectively.

Each blend or control was prepared by mixing ingredients in a Brabender Plastograph internal mixer for about seven minutes at 195° C. using a 100 rpm rotor speed. 70 grams total of each blend was obtained and processed by compression molding at 195° C. in order to prepare test samples for testing of mechanical and thermal properties. Test results for mechanical (elongation at break and ultimate tensile strength) and thermal properties (using the Dynamic Mechanical Thermal Analyzer (DMTA)) are shown in Table II. Values in Table II were averaged after testing was carried out 5 times for each example.

TABLE II

| Example # | PVC Compound (Wt. %) | Polyamide 12 (Wt. %) | Block Co-Polymer (Wt. %) | Elongation at Break (%) | Ultimate Tensile Strength (Mpa) | Temperature at which E' falls to 100 Mpa in DMTA Test (° C.) |
|---|---|---|---|---|---|---|
| 3 (Control) | 100 | 0 | 0 | 150 | 43 | 80 |
| 4 (Control) | 80 | 20 | 0 | 50 | 17 | 80 |
| 5 | 72 | 18 | 10 | 200 | 45 | 130 |
| 6 (Control) | 60 | 40 | 0 | 119 | 29 | 125 |
| 7 | 54 | 36 | 10 | 243 | 44 | 160 |
| 8 (Control) | 40 | 60 | 0 | 299 | 40 | Not tested |
| 9 | 36 | 54 | 10 | 320 | 43 | Not tested |
| 10 (Control) | 20 | 80 | 0 | 412 | 53 | Not tested |
| 11 | 18 | 72 | 10 | 440 | 54 | Not tested |
| 12 (Control) | 0 | 100 | 0 | 570 | 60 | 170 |

The data in Table II demonstrates substantial improvement in mechanical and thermal properties of PVC compound when it is blended with both Polyamide 12 and the poly(ε-caprolactone/ω-lauryl lactam) block copolymers of this invention. Surprisingly, side-by-side comparison of Examples 5, 7, 9, and 11 with Control Examples 4, 6, 8, and 10 respectively shows that the block copolymers of the present invention act as compatibilizers enhancing mechanical properties (elongation at break and ultimate tensile strength) of the ternary polymer blends over the mechanical properties of binary polymer PVC/polyamide 12 blends made without the block copolymer, especially at high levels of PVC. Also surprisingly, side-by-side comparison of Examples 5 and 7 with Examples 4 and 6 respectively shows that the block copolymers of the present invention act as compatibilizers enhancing the thermal properties (DMTA) of the ternary blends over the thermal properties of the binary PVC/polyamide 12 blends made without the block copolymer.

Examples 13 to 17

Testing of Poly(ε-caprolactone/ω-lauryl Lactam) Di-block Copolymer as a Compatibilizing Agent for Blending of PVC and Polyamide 12 Using M-EPDM as an Impact Modifier The PVC, M-EPDM and polyamide 12 compositions used in the experiments below are described in the "List of Chemicals" above. The poly(ε-caprolactone/ω-lauryl lactam) di-block copolymer used as a compatibilizing agent in 4-polymer component blends was the copolymer prepared in Example 1.

3-Polymer blends of PVC compound, M-EPDM, and polyamide 12 were prepared in ratios of 80/10/10 and 60/20/20 wt. % (based on the total weight of the blend) without inclusion of poly(ε-caprolactone/ω-lauryl lactam) block copolymer. Comparison 4-polymer blends were prepared using PVC compound, M-EPDM, and polyamide 12 in approximately the same weight ratios to each other, but also including poly(ε-caprolactone/ω-lauryl lactam) di-block copolymer in an amount of 10 wt. % of the total weight of each 4-polymer blend. Control blend (Example 13) was prepared containing 100 wt. % PVC.

Each blend or control was prepared by mixing ingredients in a Brabender Plastograph internal mixer for about seven minutes at 210° C. using a 100 rpm rotor speed. 70 grams total of each blend was obtained and processed by compression molding at 195° C. in order to prepare test samples for testing of mechanical properties. Test results for mechanical (elongation at break and ultimate tensile strength) and dart impact energy (using Dynatup 8250) are shown in Table III. Values in Table III were averaged after testing was carried out 5 times for each example.

Examples 18 to 21

Testing of Poly(ε-caprolactone/ω-lauryl Lactam) Di-block Copolymer as a Compatibilizing Agent for Mechanical Properties for Blending of PVC and Polyamide 12 Using a Maleic Anhydride Modified Polypropylene (M-PP) as a Thermal Performance Modifier The PVC, PP, M-PP and polyamide 12 compositions used in the experiments below are described in the "List of Chemicals" above. The poly(ε-caprolactone/ω-lauryl lactam) di-block copolymer used as a compatibilizing agent in 5-polymer component blends was the copolymer prepared in Example 1.

First, a reactive 3-Polymer blend of PP, M-PP, and polyamide 12 (poly(ω-lauryl lactam)) was prepared in ratio of 50/17/33 wt. % (based on the total weight of the blend) as one of control blends. This control blend is named "PP-based compound" hereafter. This PP-based compound, which is composed of PP(50)/M-PP(17)/polyamide 12(33%), was prepared by mixing ingredients in a Brabender Plastograph internal mixer for about seven minutes at 230° C. using a 100 rpm rotor speed.

A 4-Polymer blend of PVC compound and PP-based compound (PP/M-PP/polyamide 12) was prepared in ratios of 70/30 wt. % (based on the total weight of the blend)

TABLE III

| Example # | PVC Com-pound (Wt. %) | M-EPDM (Wt. %) | Polyamide 12 (Wt. %) | Block Co-polymer (Wt. %) | Elongation at Break (%) | Ultimate Tensile Strength (Mpa) | Dart Impact Energy (Joule) |
|---|---|---|---|---|---|---|---|
| 13 (Control) | 100 | 0 | 0 | 0 | 155 | 42 | 1.5 |
| 14 (Control) | 80 | 10 | 10 | 0 | 40 | 30 | 0.65 |
| 15 | 72 | 9 | 9 | 10 | 225 | 40 | 7.8 |
| 16 (Control) | 60 | 20 | 20 | 0 | 35 | 27 | 1.4 |
| 17 | 54 | 18 | 18 | 10 | 280 | 35 | 30.7 |

The data in Table III demonstrates substantial toughness improvement in mechanical properties of PVC compound when it is blended with M-EPDM, polyamide 12 and the poly(ε-caprolactone/ω-lauryl lactam) block copolymer of this invention. Surprisingly, side-by-side comparison of Control Examples 14 and 16 with Examples 15 and 17 respectively shows that the block copolymers of the present invention act as a compatiblizer enhancing properties (elongation at break and ultimate tensile strength and especially impact energy properties) of polymer blends over properties of 3-polymer (PVC/M-EPDM/polyamide12) blends made without the compatibilizing block copolymer.

In a similar manner as set forth above, impact modifiers can be utilized with a blend of PVC and nylon 12 utilizing a block copolymer wherein the lactam block is made from two or more different lactam monomers such as caprolactam and lauryl lactam and/or lactone block is made from two or more lactone monomers.

without inclusion of poly(ε-caprolactone/ω-lauryl lactam) block copolymer. Comparison 5-polymer blends were prepared using PVC compound, PP-based compound (PP/M-PP/polyamide 12) in approximately the same weight ratios to each other, but also including poly(ε-caprolactone/ω-lauryl lactam) di-block copolymer in an amount of 10 wt. % of the total weight of the 5-polymer blend. Therefore, three control blends (Examples 18, 19 and 21) contain PVC compound(100), PVC(70)/PP-based compound(30), and PP-based compound(100), respectively.

Each blend or control was prepared by mixing ingredients in a Brabender Plastograph internal mixer for about seven minutes at 200° C. using a 100 rpm rotor speed. 70 grams total of each blend was obtained and processed by compression molding at 195° C. in order to prepare test samples for testing of mechanical properties. Test results for mechanical (elongation at break and ultimate tensile strength) are shown in Table IV. Values in Table IV were averaged after testing was carried out 5 times for each example.

TABLE IV

| Example # | PVC Compound (Wt. %) | PP-Based Compound* (Wt. %) | Block Copolymer (Wt. %) | Elongation at Break (%) | Ultimate Tensile Strength (Mpa) | Temp at Which E' falls to 20 Mpa in DMTA (° C.) |
|---|---|---|---|---|---|---|
| 18 (Control) | 100 | 0 | 0 | 152 | 42 | 85 |
| 19 (Control) | 70 | 30 | 0 | 19 | 8 | 112 |
| 20 | 63 | 27 | 10 | 180 | 40 | 125 |
| 21 (Control) | 0 | 100 | 0 | 300 | 22 | 150 |

*PP-based compound: PP(50)/M-PP(17)/Polyamide 12 (33%))

The data in Table IV demonstrates substantial improvement in the mechanical properties of the PVC compound when it is blended with a thermal performance modifier of a PP-based compound and the poly(ε-caprolactone/ω-lauryl lactam) block copolymer of this invention. Surprisingly, the comparison of Control Example 19 with Example 20 shows that the block copolymers of the present invention act as a compatibilizer enhancing mechanical properties (elongation at break and ultimate tensile strength) of 5-polymer blend over the mechanical properties of 4-polymer (PVC/PP/M-PP/Polyamide12) blend made without the block copolymer. When PVC (63) is blended with PP-based Compound (27) with the block copolymer (10 Wt %), the temperature at which storage modulus (E') falls to 20 Mpa is 40 and 13° C. higher, respectively than those of PVC (Example 1) and PVC/PP-based compound without the block copolymer (Example 2) as summarized in Table IV.

In a manner as set forth hereinabove, a blend of PVC and polypropylene can be made utilizing a thermal performance modifier as well as a block copolymer compatibilizing agent wherein the lactam block is made from two or more lactam monomers such as caprolactam and lauryl lactam and/or the lactone block is made from two or more lactone monomers.

Naturally the block copolymers of the present invention, as well as the compatibilized blends, can be used in numerous applications where their properties are desired.

While in accordance with the patent statutes the best mode and preferred embodiment has been set forth, the scope of the invention is not limited thereto, but rather by the scope of the attached claims.

What is claimed is:

1. A compatibilized polymer blend comprising:
at least one carbonyl containing polymer; at least one chlorine containing polymer; and from about 1 to about 30 parts by weight of a lactone/lactam block copolymer compatibilizing agent per 100 parts by weight of said carbonyl containing polymer and said chlorine containing polymer, wherein said block copolymer is an AB or an ABA block copolymer, wherein said A block is derived from at least one said lactone monomer and wherein said B block is derived from at least one said lactam monomer, wherein said lactone block is made from a lactone monomer having from 4 to about 10 carbon atoms, and wherein said lactam block is made from a lactam monomer having from 4 to about 20 carbon atoms.

2. A compatibilized polymer blend according to claim 1, wherein said carbonyl containing polymer comprises polyamide, wherein said polyamide is derived from an internal lactam having from about 4 to about 20 carbon atoms, or is derived from the reaction of a diamine having from 4 to about 15 carbon atoms and a dicarboxylic acid having from about 4 to about 15 carbon atoms; wherein the amount of said chlorine containing polymer is from about 15% to about 90% by weight based upon the total weight of said chlorine containing polymer and said carbonyl containing polymer, and wherein said chlorine containing polymer is polyvinyl chloride, chlorinated polyvinyl chloride, polyvinylidene chloride, a chlorinated polyolefin, a copolymer of polyvinyl chloride, or blends thereof.

3. A compatibilized polymer blend according to claim 2, wherein said chlorine containing polymer is polyvinyl chloride, chlorinated polyvinyl chloride, a copolymer of polyvinyl chloride, or blends thereof, and wherein said carbonyl containing polymer is polyamide 12, polyamide 6–12, Polyamide 12—12, or blends thereof, and wherein the amount of said block copolymer is from about 5 to about 15 parts by weight per 100 parts by weight of said carbonyl containing polymer and said chlorine containing polymer.

4. A compatibilized polymer blend according to claim 3, wherein the amount of said lactam in said block copolymer is from about 35% to 80% by weight, wherein the amount of lactone is said block copolymer is from about 20% to about 65% by weight based upon the total weight of said lactam-lactone block copolymer, and wherein the number average molecular weight of at least one lactam block and of at least one lactone block, independently, is from about 5,000 to about 180,000.

5. A compatibilized polymer blend according to claim 4, wherein said lactone block is made from ε-caprolactone, and wherein said lactam block is made from ω-lauryl lactam and ε-caprolactam.

6. A composition according to claim 4, wherein said lactone block is derived from ε-caprolactone, and wherein said lactam block is derived from ω-lauryl lactam and from ε-caprolactam monomers.

7. A composition according to claim 6, wherein said block copolymer comprises a di-block copolymer.

8. A composition according to claim A, wherein said block copolymer comprises a tri-block copolymer.

* * * * *

UNITED STATES PATENT AND TRADEMARK OFFICE
CERTIFICATE OF CORRECTION

PATENT NO. : 6,747,096 B2
DATED : June 8, 2004
INVENTOR(S) : James L. White, Charles E. Wilkes and Byong-Jun Kim It is certified that error appears in the above-identified patent and that said Letters Patent is hereby corrected as shown below:

<u>Column 20,</u>
Line 50, please correct Claim 5 as follows:
    5. A compatibilized polymer blend according to claim 4, wherein said lactone block is made from ε-caprolactone, and wherein said lactam block is made from ω-lauryl lactam and ε-caprolactam.

Line 60, please correct Claim 8 as follows:
    8. A composition according to claim 7 wherein said block copolymer comprises a tri-block copolymer.

Signed and Sealed this

Second Day of November, 2004

JON W. DUDAS
*Director of the United States Patent and Trademark Office*

UNITED STATES PATENT AND TRADEMARK OFFICE
CERTIFICATE OF CORRECTION

PATENT NO.   : 6,747,096 B2
DATED        : June 8, 2004
INVENTOR(S)  : James L. White, Charles E. Wilkes and Byong-Jun Kim It is certified that error appears in the above-identified patent and that said Letters Patent is hereby corrected as shown below:

<u>Column 20,</u>
Line 60, please correct Claim 8 as follows:
    8. A composition according to claim 6 wherein said block copolymer comprises a tri-block copolymer.

Signed and Sealed this

Eighth Day of February, 2005

JON W. DUDAS
*Director of the United States Patent and Trademark Office*